(12) United States Patent
Meuth et al.

(10) Patent No.: US 10,081,990 B2
(45) Date of Patent: Sep. 25, 2018

(54) KICKER SYSTEM FOR TUBULAR HANDLING SYSTEM

(71) Applicant: FORUM US, INC., Houston, TX (US)

(72) Inventors: Joshua Brandon Meuth, Giddings, TX (US); Timothy Sherbeck, Katy, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 15/154,916

(22) Filed: May 13, 2016

(65) Prior Publication Data

US 2017/0328146 A1 Nov. 16, 2017

(51) Int. Cl.
| | |
|---|---|
| B65G 27/08 | (2006.01) |
| B65G 47/88 | (2006.01) |
| E21B 19/15 | (2006.01) |
| E21B 19/14 | (2006.01) |
| B21D 43/00 | (2006.01) |

(52) U.S. Cl.
CPC .......... *E21B 19/14* (2013.01); *B21D 43/006* (2013.01); *B65G 27/08* (2013.01)

(58) Field of Classification Search
CPC ..... E21B 19/155; E21B 19/14; B21D 43/006; B65G 27/08; B66F 7/0608
USPC ............ 123/197.1; 187/211; 198/360, 468.6, 198/468.7, 468.9, 621.3, 736, 750.8, 198/774.1, 774.2, 774.3; 254/10 B, 10 R; 414/15, 745.4, 745.7, 745.8, 745.9, 746.1, 414/746.2, 746.3, 746.4, 746.6, 746.7, 414/746.8; 74/103, 110, 128, 469, 88; 92/138, 140
See application file for complete search history.

(56) References Cited

U.S. PATENT DOCUMENTS

| | | | |
|---|---|---|---|
| 495,716 A * | 4/1893 | Wilkinson ............. | B65G 27/08 414/746.1 |
| 526,624 A * | 9/1894 | Hill ....................... | B65G 27/08 414/746.1 |
| 1,725,216 A * | 8/1929 | Seldomridge ......... | B66F 7/0608 108/147 |
| 1,727,182 A * | 9/1929 | Smith ................... | B66F 7/0608 187/211 |
| 2,896,796 A * | 7/1959 | Schuetz ............. | B65G 47/8846 198/560 |
| 3,394,822 A * | 7/1968 | Bethke ................. | B21B 39/008 193/36 |

(Continued)

FOREIGN PATENT DOCUMENTS

| | | |
|---|---|---|
| CA | 2224638 A1 | 6/1999 |
| WO | 2013/123602 A1 | 8/2013 |

OTHER PUBLICATIONS

International Search Report and Written Opinion dated Jun. 21, 2017, corresponding to Application No. PCT/US2017/026439.

*Primary Examiner* — Gregory W Adams
(74) *Attorney, Agent, or Firm* — Patterson + Sheridan, LLP (57) ABSTRACT

A kicker assembly for a tubular handling system has a moving member of a linear actuator that moves between a first position on a fixed member of the linear actuator and a second position on the fixed member. The moving member of the linear actuator is connected to a kicker shoe by one or more connecting members to move the kicker shoe from a retracted to an extended position to move a tubular out of the tubular handling system. The axis of the fixed member of the linear actuator runs substantially perpendicular to the motion of the kicker shoe.

20 Claims, 6 Drawing Sheets

(56) References Cited

U.S. PATENT DOCUMENTS

| | | | | |
|---|---|---|---|---|
| 4,361,203 A | * | 11/1982 | Buschbom | B62D 5/09 180/213 |
| 4,386,883 A | | 6/1983 | Hogan et al. | |
| 4,586,572 A | * | 5/1986 | Myers | E21B 15/04 175/85 |
| 4,624,448 A | * | 11/1986 | Lawman | B66F 3/245 254/122 |
| 5,014,602 A | * | 5/1991 | Iwata | F15B 11/123 92/117 A |
| 5,222,424 A | * | 6/1993 | Yanagisawa | B23Q 1/621 91/176 |
| 5,320,208 A | | 6/1994 | Mason | |
| 5,339,749 A | * | 8/1994 | Hirose | B23Q 1/5468 108/137 |
| 5,481,769 A | * | 1/1996 | Schneider | A47C 20/041 5/424 |
| 5,746,138 A | * | 5/1998 | Hirose | B25J 9/106 108/143 |
| 7,093,510 B2 | * | 8/2006 | Andreasson | B23Q 5/404 74/424.71 |
| 7,093,691 B1 | * | 8/2006 | Vaughan | B66B 9/0815 108/106 |
| 7,832,974 B2 | | 11/2010 | Fikowski et al. | |
| 8,454,296 B2 | * | 6/2013 | Gerber | E21B 19/15 198/468.6 |
| 8,801,356 B2 | | 8/2014 | Gerber | |
| 8,840,352 B2 | * | 9/2014 | Taggart | E21B 19/155 414/22.54 |
| 2006/0104746 A1 | | 5/2006 | Thompson | |
| 2009/0196711 A1 | | 8/2009 | Gerber et al. | |
| 2011/0259640 A1 | * | 10/2011 | Gerber | E21B 19/14 175/52 |
| 2014/0286732 A1 | | 9/2014 | Swanson et al. | |
| 2014/0299313 A1 | | 10/2014 | Messmer et al. | |
| 2015/0008038 A1 | * | 1/2015 | Folk | E21B 19/155 175/52 |
| 2015/0240576 A1 | | 8/2015 | Dore et al. | |

* cited by examiner

KICKER SYSTEM FOR TUBULAR HANDLING SYSTEM

BACKGROUND

Field

Embodiments of the disclosure generally relate to tubular handling systems, such as a catwalk, for conveying pipe to a drill floor from a lower section of a drilling rig or drill site, and returning pipe to the lower section from the drill floor. The disclosure also by extension relates to any other tubular handling systems for conveying tubulars. Specifically, embodiments of the disclosure relate to a kicker system that is used to remove pipe from the tubular handling system.

Description of the Related Art

In a drilling operation or rig work-over operation, whether on a water-based or land-based drilling rig, pipe for the drilling operation, casing, or other tubulars are often stored at or supplied from a pipe deck at a level that is lower than the drill floor. Operators typically use a "tubular handling system," such as a catwalk, to convey the pipe from the pipe deck to the drill floor, and to return pipe to the pipe deck after use. The tubular handling system typically has a trough that holds the pipe when being transferred to and from the drill floor. The pipe is typically mechanically transported (e.g. pushed with a skate and/or pulled in the trough) from a level below the rig floor to the rig floor.

Often the tubular handling system will have a kicker system used to remove pipe from the tubular handling system for placement back on the pipe deck. Typically, kicker systems involve one or more kickers positioned along the tubular handling system that lift the pipe to remove it from the tubular handling system. Often kicker systems must lift the pipe to an elevation above the side of the tubular handling system, relying on gravity for the pipe to roll or fall away from the tubular handling system toward the pipe deck. Also, current kicker systems often require linear actuators that move perpendicular to the longitudinal length of the tubular handling system, which takes up space in the tubular handling system.

Accordingly, it would be useful to have a kicker system that removes the pipe without requiring actuator motion perpendicular to the tubular handling system, and without having to lift the pipe such that gravity must be used to allow the pipe to roll or fall away from the tubular handling system.

SUMMARY

In one embodiment, a kicker assembly in a tubular handling system is provided. The kicker assembly includes a shoe, a moving member of a linear actuator, at least one link member connecting the moving member of the linear actuator to the shoe, and a fixed member of the linear actuator connected to the tubular handling system, wherein the moving member is configured to move over the fixed member between a first position on the fixed member and a second position on the fixed member to move the shoe in a direction that is substantially perpendicular to a longitudinal axis of the linear actuator.

In another embodiment, a kicker assembly in a tubular handling system is provided. The kicker assembly includes a first kicker comprising a first shoe, a first moving member of a first linear actuator, at least one first link member connecting the first moving member to the first shoe; and a first fixed member of the first linear actuator connected to the tubular handling system. The kicker assembly also includes a second kicker comprising a second shoe, a second moving member of a second linear actuator, at least one second link member connecting the second moving member to the second shoe, and a second fixed member of the second linear actuator connected to the tubular handling system, wherein the first moving member is configured to move over the first fixed member between a first position and a second position to move the first shoe in a first direction that is substantially perpendicular to a longitudinal axis of the first linear actuator, and wherein the second moving member is configured to move over the second fixed member between a third position and a fourth position to move the second shoe in a second direction that is substantially perpendicular to a longitudinal axis of the second linear actuator.

In another embodiment, a kicker assembly in a tubular handling system is provided. The kicker assembly includes a first kicker having a first shoe, a first linear actuator, and at least one first link member connecting the first shoe to the first linear actuator, wherein the first linear actuator is configured to move the first shoe in a first direction that is substantially perpendicular to a longitudinal axis of the first linear actuator. The kicker assembly also includes a second kicker having a second shoe, a second linear actuator, and at least one second link member connecting the second shoe to the second linear actuator, wherein the second linear actuator is configured to move the second shoe in a second direction that is substantially perpendicular to a longitudinal axis of the second linear actuator

BRIEF DESCRIPTION OF THE DRAWINGS

The appended drawings illustrate only typical embodiments and are therefore not to be considered limiting of the scope of the disclosure.

FIG. 4C shows an embodiment of two kickers, one in a retracted state and one in a fully extended state, in a cross section of the tubular handling system.

DETAILED DESCRIPTION

Figure 1:
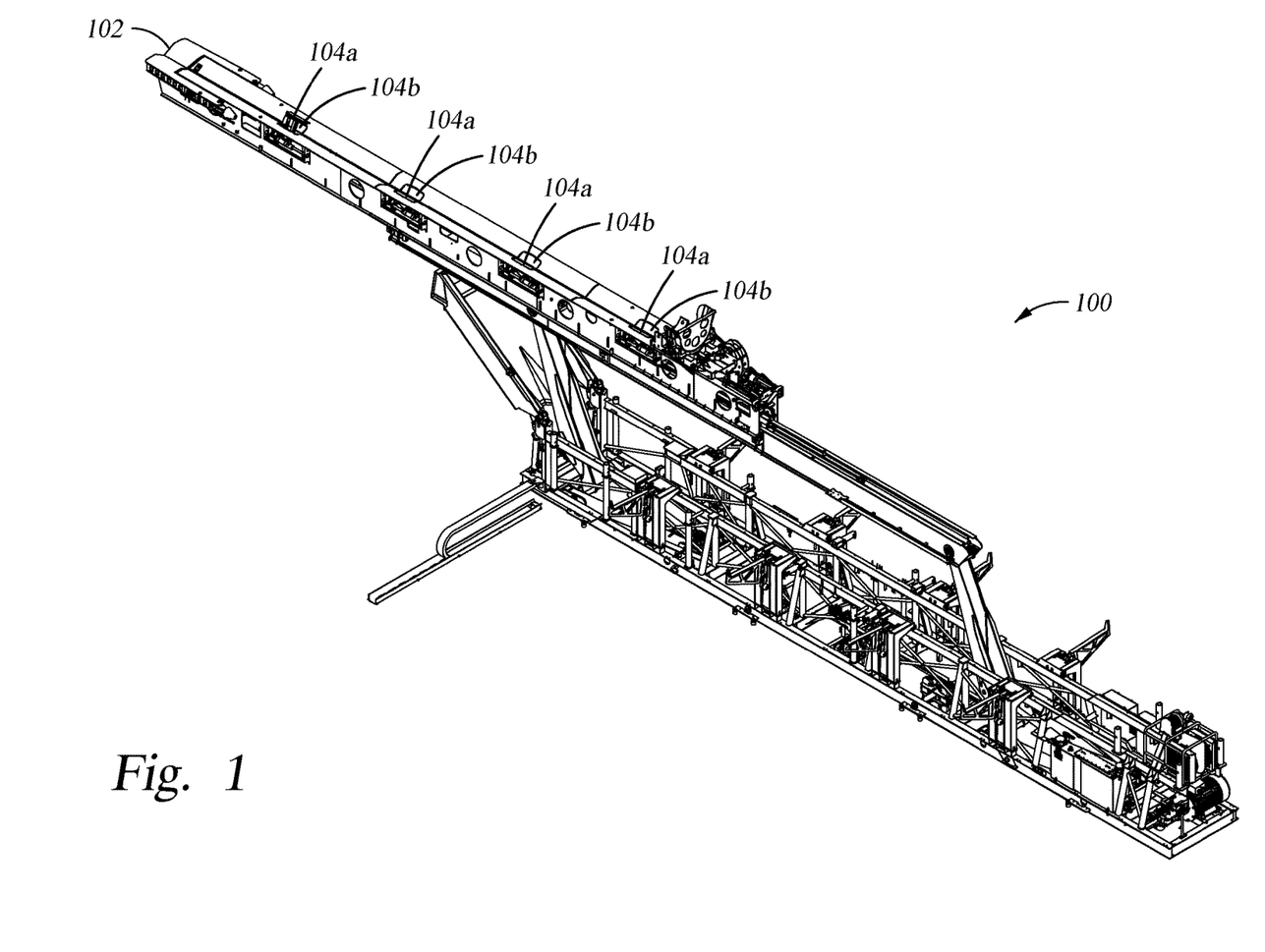
FIG. 1 shows an embodiment of a tubular handling system having a kicker system.

FIG. 1 shows an embodiment of a tubular handling system 100 having a kicker system. As described herein and shown in the drawings, the tubular handling system 100 is as a catwalk having a trough. However, the embodiments described herein are not limited to use with a catwalk, but may be used with other types of tubular handling systems for handling and moving tubulars.

In FIG. 1, the tubular handling system 100 has a trough 102 for delivering pipe to a rig floor from a pipe deck, and returning pipe from the rig floor to the pipe deck. The kicker system in FIG. 1 includes several kickers 104a, 104b for removing pipe from the trough 102 for return to a pipe deck.

Figure 2:
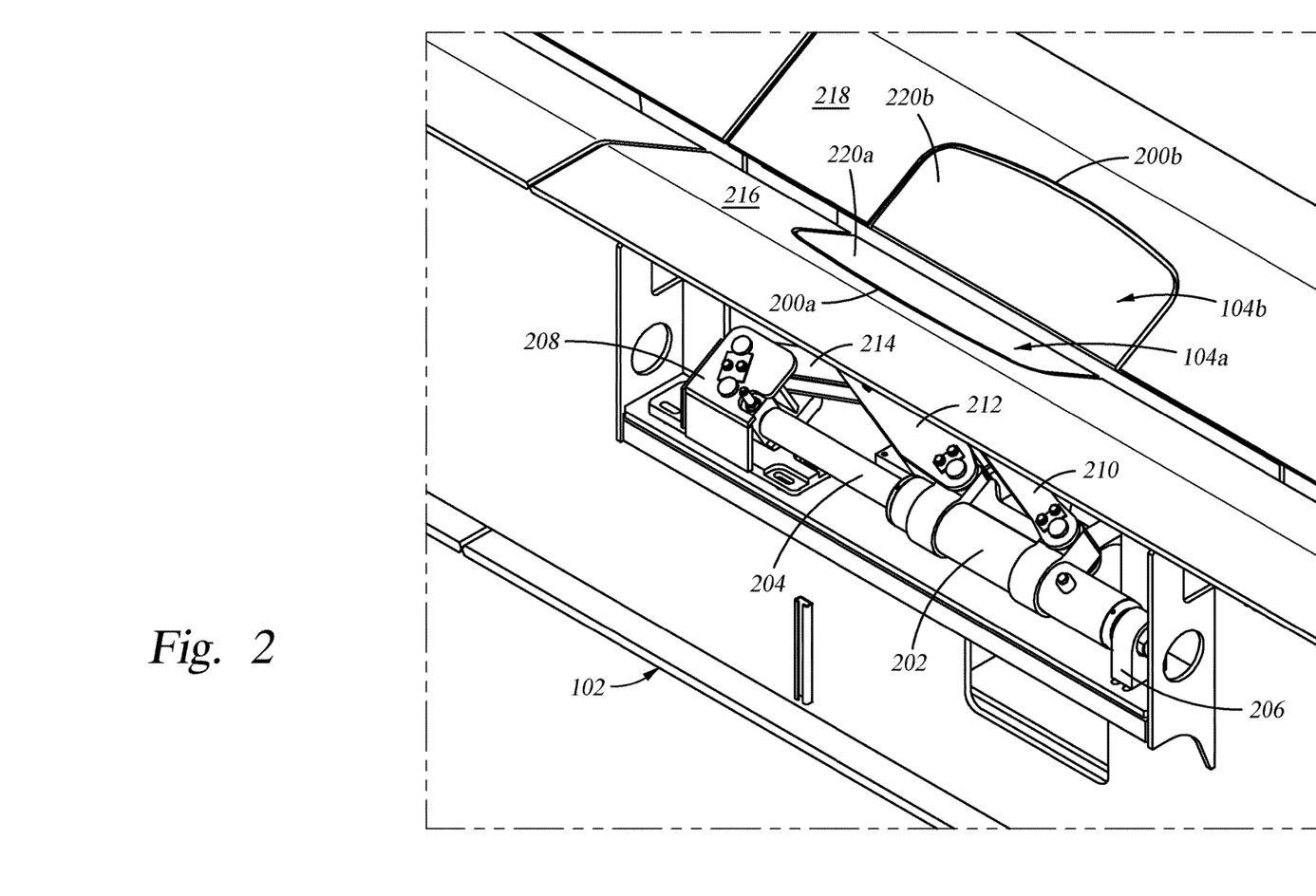
FIG. 2 shows an enlarged view of the kicker system in the tubular handling system shown in FIG. 1.

FIG. 2 shows an enlarged sectional view of the kicker system shown in the trough 102 of the tubular handling system 100 in FIG. 1. A first kicker 104a is in a retracted state in the trough 102 of the tubular handling system 100. The first kicker 104a has a shoe 200a, having a pipe receiving surface 220a that is flush with a first pipe receiving surface 216 of the trough 102. Every component of the first kicker 104a other than the shoe 200a is below the pipe receiving surface 216 of the trough 102, the components including a linear actuator moving member 202, a fixed member 204, a pivot point 208, a mount block 206, and link members 210, 212, 214. A second kicker 104b is adjacent to the first kicker 104a, and is also shown in a retracted state. The shoe 200b of the second kicker 104b has a pipe receiving surface 220b that is flush with a second pipe receiving surface 218 of the trough 102.

Figure 3A:
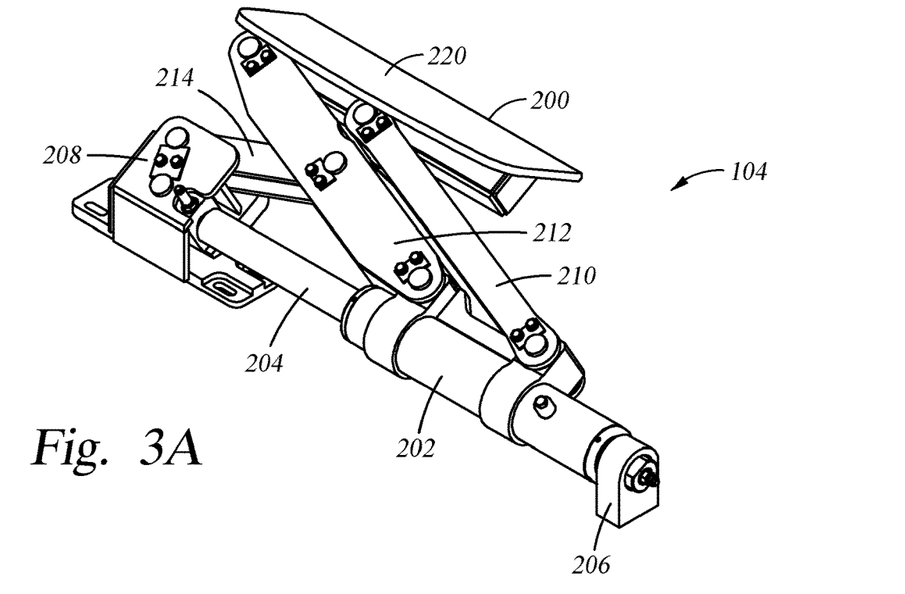
FIG. 3A shows an embodiment of a kicker in a retracted state.
Figure 3B:
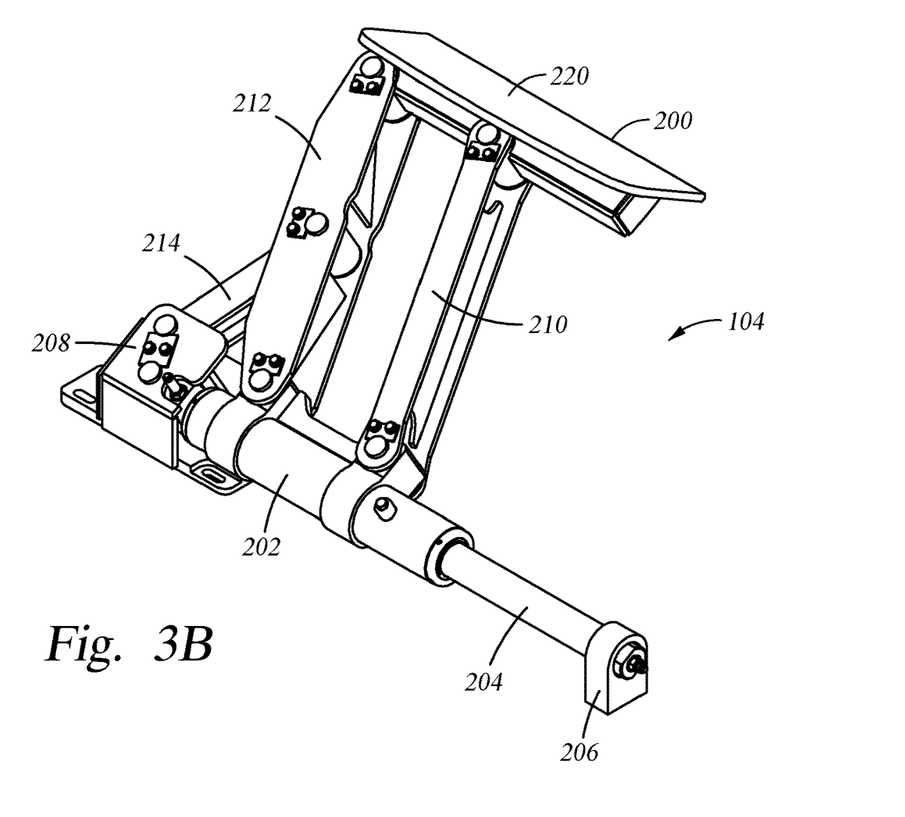
FIG. 3B shows an embodiment of a kicker in an extended state.

FIG. 3A shows an embodiment of a kicker 104 in a retracted state, and FIG. 3B shows an embodiment of the kicker 104 in an extended state. The kicker 104 is an example embodiment of a single kicker that is not limited by the orientation shown, and could be oriented and placed as kickers 104a or kickers 104b in FIGS. 1 and 2.

The kicker 104 includes a shoe 200 having a pipe receiving surface 220. The shoe 200 is connected to a linear actuator by a primary link member 212, a secondary link member 214, and optionally by an additional link member 210. The linear actuator includes a linear actuator moving member 202, such as a hydraulic cylinder, and a fixed member 204, such as a rod, that runs through the linear actuator moving member 202 between a pivot point 208 and a mount block 206.

The secondary link member 214 connects the pivot point 208 to the primary link member 212 and is configured to guide the position of the shoe 200. The primary link member 212 and the secondary link member 214 may be connected to form a Scott Russell linkage as known in the art. In one embodiment, the shoe 200 may be integrally formed with the primary link member 212 such that the shoe 200 and the primary link member 212 form a single piece.

The shoe 200 is coupled to the linear actuator moving member 202 by the primary link member 212 and the secondary link member 214 such that the shoe 200 moves in a direction (or along an axis or path) when extended and retracted that is substantially perpendicular to the longitudinal axis of the linear actuator moving member 202 and/or the fixed member 204. Alternatively stated, the longitudinal axis of the linear actuator moving member 202 and/or the fixed member 204 is substantially perpendicular to the movement of the shoe 200. The shoe 200 is extended and/or retracted in a direction (or along an axis or path) while maintaining effective engagement with a tubular.

The linear actuator moving member 202 is configured to move over the fixed member 204 between a first position on the fixed member 204, near the mount block 206, and a second position on the fixed member 204, near the pivot point 208. When the linear actuator moving member 202 is configured in the first position on the fixed member 204, near the mount block 206, the shoe 200 is in the retracted position, as shown in FIG. 3A. When the linear actuator moving member 202 is configured in the second position on the fixed member 204, near the pivot point 208, the shoe 200 is in the extended state, as shown in FIG. 3B. A piston may be coupled to the fixed member 204 located within the linear actuator moving member 202. Pressure may be introduced on either side of the piston in order to move the linear actuator moving member 202 between the first and second positions along the fixed member 204 (thus retracting and extending the shoe 200).

In one embodiment of the kicker system, several kickers 104 may be connected by one fixed member 204 along the length of the trough 102. For example, there could be two different kickers 104, with two different linear actuator moving members 202 moving over a single fixed member 204 at different locations along the trough 102. A distance between the first position and the second position on one fixed member 204 may be the same as a distance between corresponding positions on another fixed member 204.

Figure 4A:
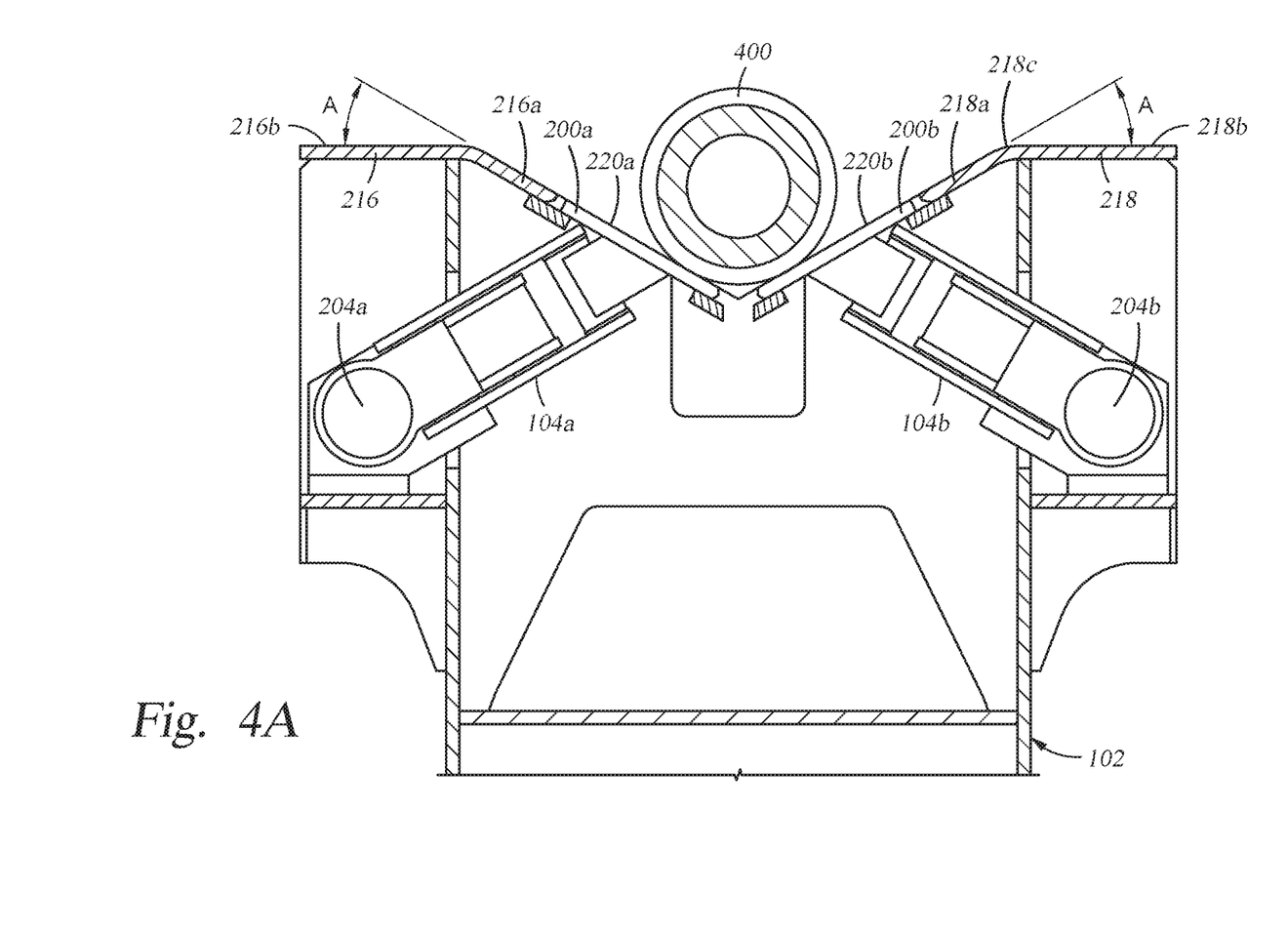
FIG. 4A shows an embodiment of two kickers in retracted states in a cross section of a tubular handling system.

FIG. 4A shows an embodiment of two kickers 104a, 104b in fully retracted states in a cross section of the trough of the tubular handling system 100. A pipe 400, or other type of tubular, sits in the trough 102 on the first pipe receiving surface 216 and the second pipe receiving surface 218. Each of these surfaces 216, 218 has respective inclining portions 216a, 218a, and respective horizontal portions 216b, 218b, with the inclining portions 216a, 218a inclining at an angle A. For example, in an exemplary embodiment, the inclining angle A may be about 30 degrees. Two kickers 104a, 104b are adjacent to each other in the trough 102.

The first kicker 104a has a shoe 200a with a pipe receiving surface 220a that is planar to the first pipe receiving surface 216 of the trough 102. The pipe receiving surface 220a of the first shoe 200a lies flush with the first pipe receiving surface 216 of the trough 102 when in the retracted state. The second kicker 104b has a shoe 200b having a pipe receiving surface 220b that is planar to the second pipe receiving surface 218 of the trough 102. The pipe receiving surface 220b of the second shoe 200b lies flush with the second pipe receiving surface 218 of the trough 102 when in the retracted state.

Other than the shoes 200a, 200b, all other components of the kickers 104a, 104b are underneath the pipe receiving surfaces 216, 218 of the trough 102. The fixed member 204a of the first kicker 104a is positioned on an opposite side of the trough 102 relative to the fixed member 204b of the second kicker 104b underneath the pipe receiving surfaces 216, 218 of the trough 102. The fixed members 204a, 204b may be positioned substantially parallel to the longitudinal length of the trough 102.

Figure 4B:
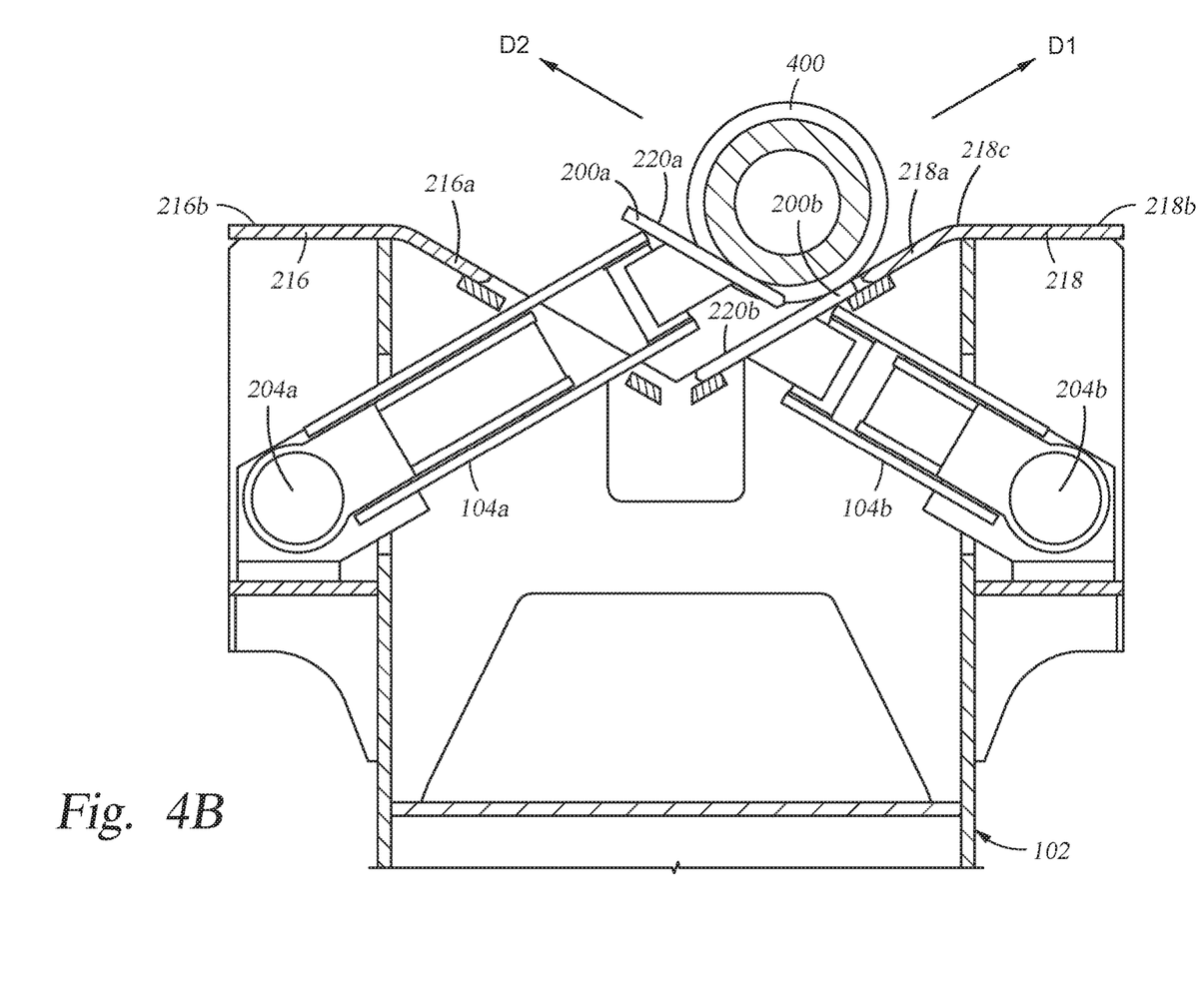
FIG. 4C shows an embodiment of two kickers, one in a retracted state and one in a partially extended state, in a cross section of the tubular handling system.

FIG. 4B shows the two kickers 104a, 104b from FIG. 4A, with the second kicker 104b remaining in the retracted position, and with the first kicker 104a partially extended. The pipe receiving surface 220a of the shoe 200a contacts the pipe 400 as the shoe 200a pushes the pipe 400 up the pipe receiving surface 220b of the second shoe 200b, and up the second pipe receiving surface 218 of the trough 102. The pipe receiving surface 220a of the shoe 200a of the first kicker 104a is no longer flush with the first pipe receiving surface 216, but remains planar to the first pipe receiving surface 216, as it moves in a direction D1 parallel to the second pipe receiving surface 218 of the trough 102. The direction D1 is substantially perpendicular to the longitudinal axis of the linear actuator moving member 202a and/or the fixed member 204a.

If the second kicker 104b were extended, with the first kicker 104a remaining in the retracted position, the pipe receiving surface 220b of the shoe 200b would contact the pipe 400 as the shoe 200b pushes the pipe 400 up the pipe receiving surface 220a of the shoe 200a, and up the first pipe receiving surface 216 of the trough 102. The pipe receiving surface 220b of shoe 200b of the second kicker 104b would remain planar to the second pipe receiving surface 218 of the trough 102 as it moves in a direction D2 parallel to the first pipe receiving surface 216 of the trough 102. The direction D2 is substantially perpendicular to the longitudinal axis of the linear actuator moving member 202b and/or the fixed member 204b.

Figure 4C:
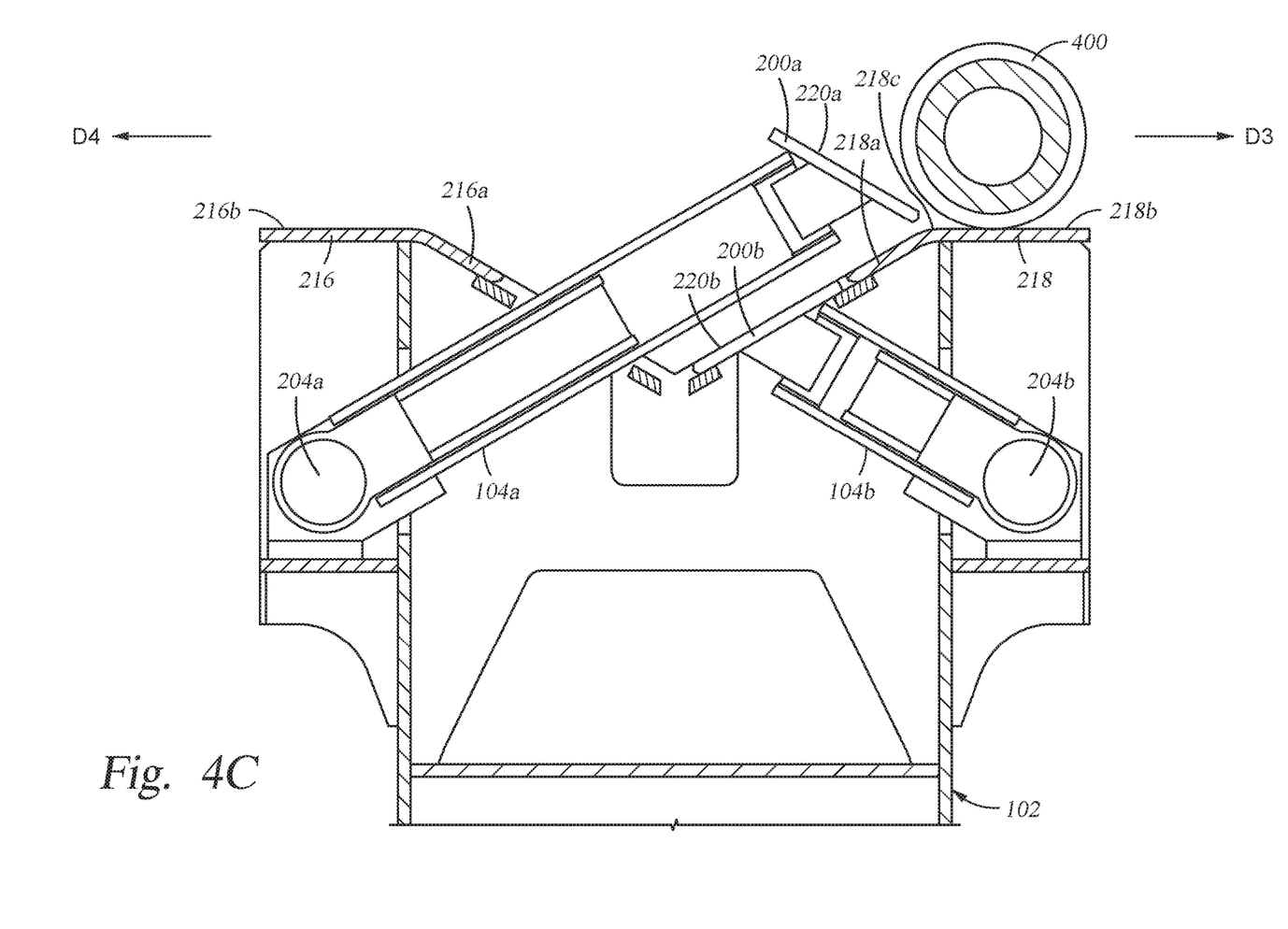

FIG. 4C shows the two kickers 104a, 104b from FIGS. 4A and 4B, with the second kicker 104b remaining in the retracted position, and with the first kicker 104a in a fully extended position. The shoe 200a of the first kicker 104a stops near a point 218c on the second pipe receiving surface 218 at the intersection between the inclining portion 218a and the horizontal portion 218b. When the first kicker 104a has fully extended, the pipe 400 comes into contact with the horizontal portion 218b of the second pipe receiving surface 218. The push of the first kicker 104a will provide momentum to the pipe 400, causing the pipe 400 to roll horizontally away from the first kicker 104a in direction D3. A pipe deck may be located next to the trough 102 in direction D3.

In this embodiment, because no portion of the fully extended shoe 200a extends beyond point 218c, no portion of the shoe 200a extends directly above the horizontal portion 218b. As such, gravity is not needed to move the pipe 400 onto the horizontal portion 218b of the second pipe receiving surface 218. Instead, the pipe 400 remains in contact with the second pipe receiving surface 218 as it moves out of the trough 102 past point 218c to the horizontal portion 218b. Only the force from the push of the first kicker 104a moves the pipe 400 out of the trough 102, causing it to roll out of the trough 102 in direction D3. If the second kicker 104b were extended, and the first kicker 104a were retracted, the pipe 400 would be pushed along the first pipe receiving surface 216 of the trough 102, until the pipe 400 exits to the left side of the trough 102 in direction D4.

In one embodiment of the kicker system, the kickers 104 may be configured such that any kicker 104 that pushes the pipe 400 to a first side of the trough 102 cannot be extended at the same time as any kicker 104 that push the pipe 400 to the opposite side of the trough 102. For example, in FIG. 4C, the first kicker 104a could not be extended when the second kicker 104b is extended, and the second kicker 104b could not be extended when the first kicker 104a is extended. In one embodiment of the kicker system, all kickers 104 that push the pipe 400 to the first side of the trough 102 may be configured to extend and retract in unison. Likewise all kickers 104 that push the pipe 400 to the opposite side of the trough 102 may be configured to extend and retract in unison.

While the foregoing is directed to some embodiments, other and further embodiments may be devised without departing from the basic scope thereof, and the scope thereof is determined by the claims that follow.

The invention claimed is:

1. A kicker assembly in a tubular handling system, the kicker assembly comprising:
   a shoe;
   a moving member of a linear actuator;
   a primary link member having an upper section and a lower section connecting the moving member of the linear actuator to the shoe, wherein the lower section of the primary link member is pivotally attached to the moving member, and wherein the upper section of the primary link member is pivotally attached to the shoe;
   a fixed member of the linear actuator connected to the tubular handling system;
   a secondary link member, wherein the secondary link member is pivotally attached to the fixed member at one end and pivotally attached to the primary link member at an opposite end, and wherein the moving member is configured to move over the fixed member between a first position on the fixed member and a second position on the fixed member to move the shoe in a direction that is away from a longitudinal axis of the linear actuator; and
   an additional link member having a lower section pivotally attached to the moving member and an upper section pivotally attached to the shoe.

2. The kicker assembly of claim 1, wherein when the moving member is in the first position, the shoe is retracted, such that a pipe receiving surface of the shoe is flush with a pipe receiving surface of the tubular handling system.

3. The kicker assembly of claim 2, wherein when the moving member is in the second position, the shoe is extended, such that the shoe is not flush with the pipe receiving surface of the tubular handling system.

4. The kicker assembly of claim 3, wherein the shoe has a first pipe receiving surface and is extended along a path to maintain engagement with a tubular when moved along the path, wherein the upper section of the primary link member is pivotally attached to the shoe below the first receiving surface.

5. The kicker assembly of claim 1, comprising a trough having an inclining portion of a pipe receiving surface, wherein the shoe has a shoe pipe receiving surface configured to be moveable between a retracted position where the shoe pipe receiving surface is flush with respect to the inclining portion and an extended position where the shoe pipe receiving surface is disposed above the inclining portion.

6. The kicker assembly of claim 1, wherein the moving member comprises a cylinder and the fixed member comprises a piston.

7. A kicker assembly in a tubular handling system, the kicker assembly comprising:
   a first kicker comprising:
      a first shoe;
      a first moving member of a first linear actuator;
      a first primary link member connecting the first moving member to the first shoe and having a first upper section and a first lower section, wherein the first lower section is pivotally attached to the first moving member, and wherein the first upper section is pivotally attached to the first shoe at a point below a pipe receiving surface of the first shoe;
      a first fixed member of the first linear actuator connected to the tubular handling system; and
      a first secondary link member, wherein the first secondary link member is pivotally attached to the first fixed member at one end and pivotally attached to the first primary link member at an opposite end; and
   a second kicker comprising:
      a second shoe;
      a second moving member of a second linear actuator;
      a second primary link member connecting the second moving member to the second shoe and having a second upper section and a second lower section, wherein the second lower section is pivotally attached to the second moving member, and wherein the second upper section is pivotally attached to the second shoe at a point below a pipe receiving surface of the second shoe;
      a second fixed member of the second linear actuator connected to the tubular handling system; and
      a second secondary link member, wherein the second secondary link member is pivotally attached to the second fixed member at one end and pivotally attached to the second primary link member at an opposite end;

wherein the first moving member is configured to move over the first fixed member between a first position and a second position to move the first shoe in a first direction that is away from a longitudinal axis of the first linear actuator; and wherein the second moving member is configured to move over the second fixed member between a third position and a fourth position to move the second shoe in a second direction that is away from a longitudinal axis of the second linear actuator.

8. The kicker assembly of claim 7, wherein when the first moving member is in the first position, the first shoe is retracted, such that the pipe receiving surface of the first shoe is flush with a first pipe receiving surface of the tubular handling system, and wherein when the first moving member is in the second position, the first shoe is extended, such that the first shoe is not flush with the first pipe receiving surface of the tubular handling system.

9. The kicker assembly of claim 8, wherein when the second moving member is in the third position, the second shoe is retracted, such that the second pipe receiving surface of the second shoe is flush with a second pipe receiving surface of the tubular handling system, and wherein when the second moving member is in the fourth position, the second shoe is extended, such that the second shoe is not flush with the second pipe receiving surface of the tubular handling system.

10. The kicker assembly of claim 9, wherein the first and second shoes are configured such that the first shoe and the second shoe cannot extend at the same time.

11. The kicker assembly of claim 9, wherein the first shoe is extended along a first path while maintaining engagement with a first tubular, and wherein the second shoe is extended along a second path while maintaining engagement with a second tubular.

12. The kicker assembly of claim 7, wherein a distance between the first position and the second position on the first fixed member is the same as a distance between the third position and the fourth position on the second fixed member.

13. The kicker assembly of claim 7, the kicker assembly comprising a trough having a first pipe receiving surface and a second pipe receiving surface, wherein the first linear actuator is longitudinally disposed along the trough and below the first pipe receiving surface, and wherein the second linear actuator is longitudinally disposed along the trough and below the second pipe receiving surface.

14. A kicker assembly in a tubular handling system, the kicker assembly comprising:
a first kicker having a first shoe, a first linear actuator, a first primary link member connecting the first shoe to the first linear actuator and having a first upper section and a first lower section, and a first secondary link member pivotally attached to a first fixed member of the first linear actuator at one end and pivotally attached to the first primary link member at an opposite end;

wherein the first linear actuator is configured to move the first shoe in a first direction that is away from a longitudinal axis of the first linear actuator, wherein the first lower section is pivotally attached to the first linear actuator, and wherein the first upper section is pivotally attached to the first shoe at a point below a pipe receiving surface of the first shoe;

a second kicker having a second shoe, a second linear actuator, a second link member connecting the second shoe to the second linear actuator and having a second upper section and a second lower section, and a second secondary link member pivotally attached to a second fixed member of the second linear actuator at one end and pivotally attached to the second primary link member at an opposite end;

wherein the second linear actuator is configured to move the second shoe in a second direction that is away from a second longitudinal axis of the second linear actuator, wherein the second lower section is pivotally attached to the second linear actuator, and wherein the second upper section is pivotally attached to the second shoe at a point below a pipe receiving surface of the second shoe.

15. The kicker assembly of claim 14, wherein the first shoe is retracted such that the pipe receiving surface of the first shoe is flush with a pipe receiving surface of the tubular handling system, and wherein the first shoe is extended such that the first shoe is not flush with the pipe receiving surface of the tubular handling system.

16. The kicker assembly of claim 15, wherein the second shoe is retracted such that the pipe receiving surface of the second shoe is flush with a pipe receiving surface of the tubular handling system, and wherein the second shoe is extended such that the second shoe is not flush with the pipe receiving surface of the tubular handling system.

17. The kicker assembly of claim 16, wherein the first and second shoes extend and retract in unison.

18. The kicker assembly of claim 16, wherein the first and second shoes extend along paths while maintaining engagement with a tubular.

19. A kicker assembly in a tubular handling system, the kicker assembly comprising:
a shoe;
a moving member of a linear actuator;
a primary link member having an upper section and a lower section connecting the moving member of the linear actuator to the shoe, wherein the lower section of the primary link member is pivotally attached to the moving member, and wherein the upper section of the primary link member is pivotally attached to the shoe;
a fixed member of the linear actuator connected to the tubular handling system;
a secondary link member, wherein the secondary link member is pivotally attached to the fixed member at one end and pivotally attached to the primary link member at an opposite end, and wherein the moving member is configured to move over the fixed member between a first position on the fixed member and a second position on the fixed member to move the shoe in a direction that is away from a longitudinal axis of the linear actuator; and
a trough having an inclining portion of a pipe receiving surface, wherein the shoe has a shoe pipe receiving surface configured to be moveable between a retracted position where the shoe pipe receiving surface is flush with respect to the inclining portion and an extended position where the shoe pipe receiving surface is disposed above the inclining portion.

20. A kicker assembly in a tubular handling system, the kicker assembly comprising:
a shoe;
a moving member of a linear actuator;
a primary link member having an upper section and a lower section connecting the moving member of the linear actuator to the shoe, wherein the lower section of the primary link member is pivotally attached to the moving member, and wherein the upper section of the primary link member is pivotally attached to the shoe;

a fixed member of the linear actuator connected to the tubular handling system, wherein the moving member comprises a cylinder and the fixed member comprises a piston;

a secondary link member, wherein the secondary link member is pivotally attached to the fixed member at one end and pivotally attached to the primary link member at an opposite end, and wherein the moving member is configured to move over the fixed member between a first position on the fixed member and a second position on the fixed member to move the shoe in a direction that is away from a longitudinal axis of the linear actuator.

* * * * *